(No Model.) 2 Sheets—Sheet 2.
L. M. DEVORE.
BICYCLE SADDLE.
No. 525,190. Patented Aug. 28, 1894.
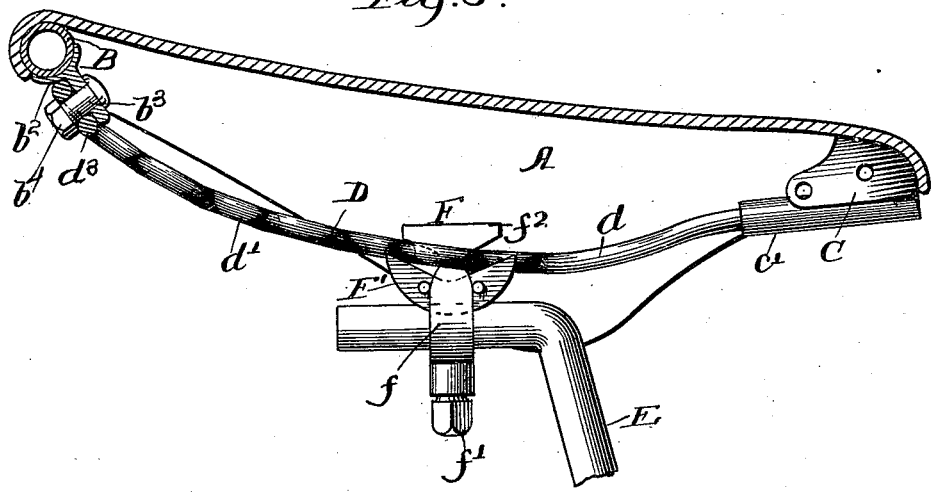
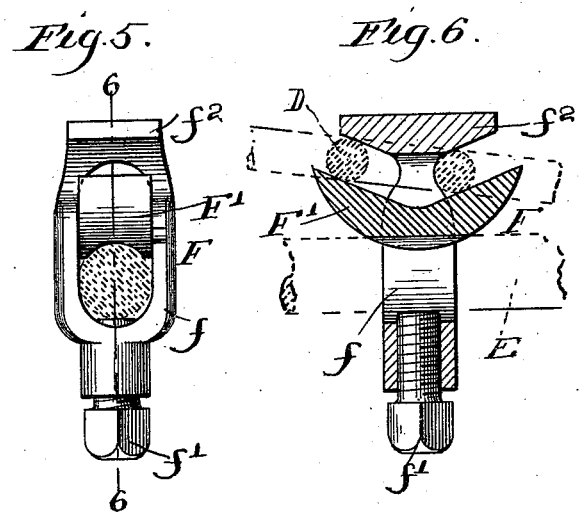
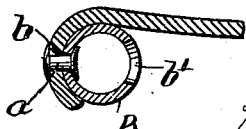
Witnesses:
Charles O. Hurley
A. H. Ebbeson
Inventor:
Levi M. Devore
by Niles Werner Bitner
Attys.

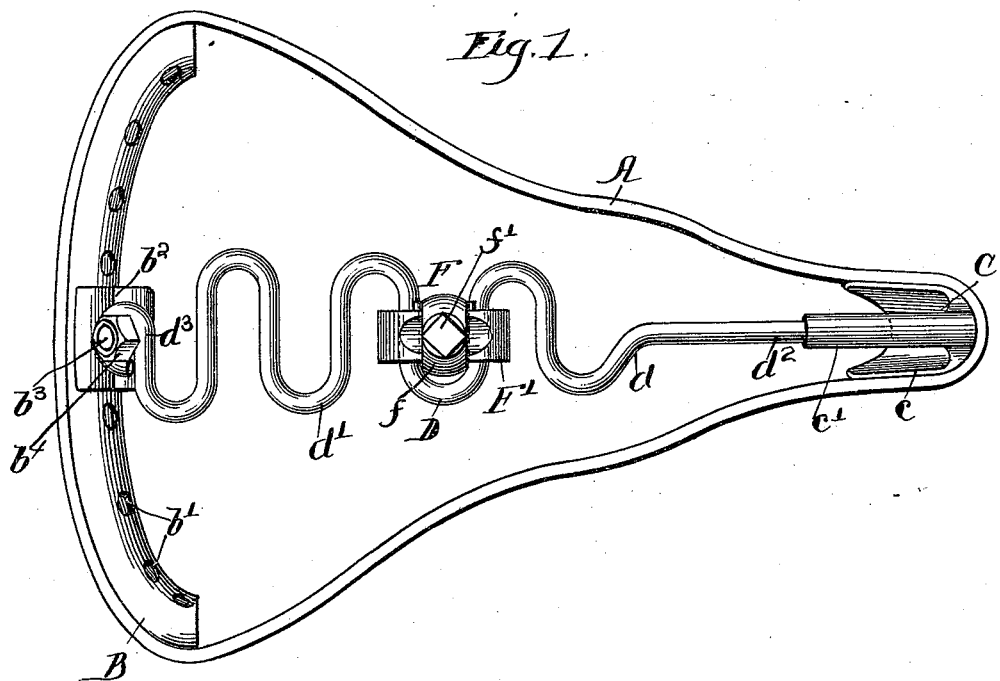
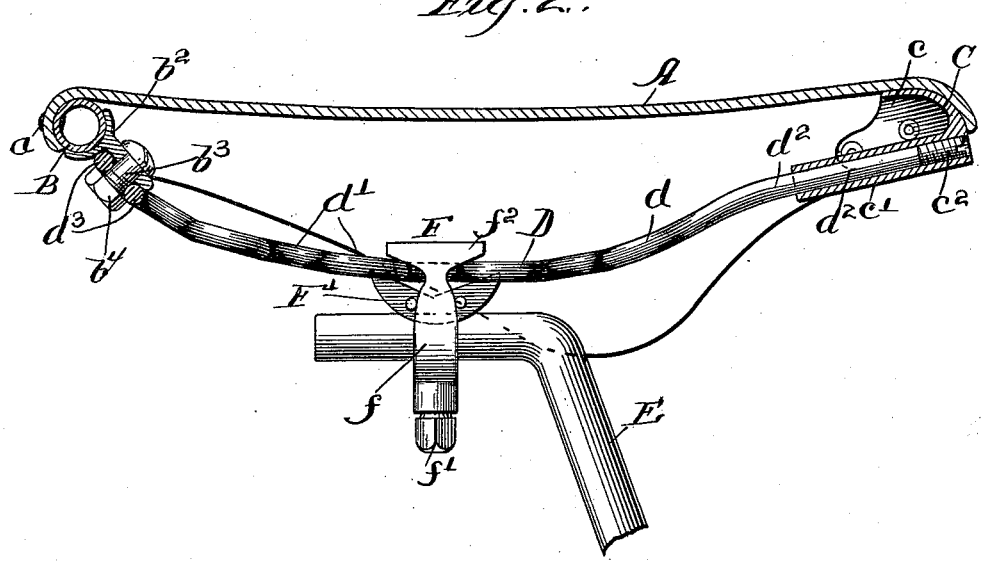

UNITED STATES PATENT OFFICE.

LEVI M. DEVORE, OF FREEPORT, ILLINOIS, ASSIGNOR OF ONE-HALF TO M. H. WILCOXON, OF SAME PLACE.

BICYCLE-SADDLE.

SPECIFICATION forming part of Letters Patent No. 525,190, dated August 28, 1894.

Application filed December 18, 1893. Serial No. 493,960. (No model.)

*To all whom it may concern:*

Be it known that I, LEVI M. DEVORE, a citizen of the United States of America, residing at Freeport, in the county of Stephenson and State of Illinois, have invented certain new and useful Improvements in Bicycle-Saddles, of which the following is a specification.

My invention relates to certain improvements in bicycle saddles having to do especially with the frame-work of the saddle and the spring upon which it is carried.

The purposes of the improvements are: First, to provide means, whereby the saddle may be given a longitudinal tilting adjustment without moving it forward or backward, and whereby the saddle may be also moved forward or backward without preventing such adjustment. Second, to provide an improved spring of such a nature as to furnish a universal yielding strain, so that the saddle may offer a graduated resistance, determined by adjustment, to the motion of the rider in any direction; that is to say that the saddle shall yield vertically, longitudinally and laterally, and shall be capable of tilting against the force of the spring both longitudinally and laterally. Third, to adapt the frame-work of a saddle to said spring, and, at the same time, to cheapen and simplify and strengthen such frame. Fourth, to provide a clamping block or clip by means of which the saddle spring may be firmly attached to the saddle rod and held in any of the possible adjustments without danger of slipping or giving in any direction.

To these ends and other minor purposes my invention consists in certain details of construction fully described below and closely defined in the claims appended hereto.

The different features of my invention are illustrated in the drawings presented herewith, by means of seven figures, of which, Figure 1 is an under plan view of a bicycle saddle showing the preferred form of my improvements, and for this purpose having the spring and the clamping block attached. Fig. 2 is a side elevation of the L-shaped saddle rod, clamping block and spring showing the saddle frame and saddle in longitudinal central vertical section. Fig. 3 is a similar view showing the saddle in a different position upon the clamping block and illustrating the longitudinal tilting adjustment. Fig. 4 is a perspective view of the portion of the saddle frame which forms the nose or pommel of the saddle. Fig. 5 is an end view of the block, or clip, by means of which the saddle spring is held upon the saddle rod. Fig. 6 is a section in line 6—6 of Fig. 5 and showing the spring and saddle rod in dotted lines; and Fig. 7 is a detail in cross-section of the rear portion of the frame work of the saddle, known as the cantle.

In the drawings, the saddle proper upon which the rider sits and which is usually made of leather is lettered A. The leather is secured at the rear end of the saddle to the cantle, B, and is tightly stretched between the same and the nose or pommel, C. The resistance to the tension of the leather is furnished by a spring, D, confined to furnish an end thrust to crowd the cantle and pommel apart. The saddle rod, such as is now used upon almost all bicycles, and which extends upward from the central portion of the frame, and is bent backward at the top to furnish a support for the saddle, is seen at E, and between this rod and the spring, D, is seen a clamping block or clip, F.

The cantle, B, is formed of a piece of light gage steel tubing bent to the proper curve and bored as seen at $b$, to receive the eyelets, $a$, by means of which the seat, A, is secured to the cantle. Opposite to the holes, $b$, are a second series of holes, $b'$, of greater diameter than the holes, $b$, so that a tool adapted to rivet or clinch the eyelets, $a$, may be inserted. At the middle of this tube, a Y-shaped piece, $b^2$, having the forks of the Y curved to fit the outline of the tube, is brazed to said tube as clearly shown in Fig. 2, the base or stem of the Y extending obliquely downward and toward the pommel of the saddle.

The pommel or nose of the saddle frame is formed by a single metal casting, C, consisting of a web-portion, $c$, shaped to form the pommel, and a tubular portion, $c'$, extending backward to furnish a socket for the forward end of the saddle spring. This socket is preferably round, so that the pommel may oscillate from side to side to aid in the lateral tilting of the saddle. The socket is also internally screw-threaded, and a screw, $c^2$, fitted to it by means of which the forward end of the spring may be crowded backward, or relaxed as may be desired in adjusting said spring to any desired tension.

The spring, D, consists of a rod, $d$, the middle portion of which is bent back and forth upon itself to form a serpentine or wave-like curve, $d'$, terminating at the front end in a substantially straight portion, $d^2$, fitted to the socket, $c'$, and at the rear end in an eye, $d^3$, which is clamped to the piece, $b^2$, by means of a bolt and nut, $b^3$, $b^4$. The middle portion of the spring is here shown as curved downward to raise the leather seat sufficiently to prevent the rider from coming in contact with the spring or the block by means of which said spring is secured to the saddle rod.

The wave-like bends in the spring are placed in a horizontal position laterally of the saddle and while furnishing all the stiffness necessary, this form of spring has several important advantages. Among these are, first, the fact that said spring can yield in every direction, giving to the saddle an ease and comfort that are impossible when the motion is limited to a tilting forward and backward, or a motion up and down; and, second, the fact that the lateral horizontal portions of the spring furnish a peculiarly advantageous attachment for a clamping and adjusting block, by means of which the saddle is secured to the saddle rod. This clamping block is seen at F, and consists of a yoke piece, $f$, provided with a clamping bolt, $f'$, at one end, and a head, $f^2$, at the other, and a sliding block, F', having a central portion fitted to slide vertically in the yoke, $f$, and shoulders adjacent thereto to prevent the block from slipping horizontally of the yoke when in position. The under surface of this block is rounded longitudinally to fit the saddle rod, E, and the upper portion is concave to correspond to the shoulders beneath the head, $f^2$, which incline downwardly toward each other as they approach the yoke-shaped portion of the clamp.

In attaching the saddle the neck of the clamping block, F, may slip in any one of the wave-like convolutions of the saddle spring as will be clearly seen from an inspection of Figs. 1, 2 and 3, and the saddle may be tilted forward or backward in any position without moving the spring longitudinally in the clamp.

The neck of the clamping block is made narrower than the space between the lateral horizontal portions of the wave-like part of the spring and the concave form of the upper surface of the sliding block, F', enables the saddle to be tilted forward or backward with perfect ease, and, yet, effectually prevents the slipping of any of the parts when they have been once firmly clamped in position.

Fig. 2 shows the saddle in its middle adjustment as to pitch, and Fig. 3 shows the limit of the forward tilt of the same.

My various improvements when combined as heretofore described form a peculiarly satisfactory construction, which commends itself more readily to the practiced rider whose experience has taught him the defects of the ordinary saddles now in use.

Among the more noticeable of the numerous advantages which my improvements afford, are, first, the fact that the inclination of the saddle forward or backward is not dependent upon the point of attachment of the saddle spring. Some riders greatly prefer to fix said point of attachment substantially at the middle of the spring which makes the action stiff and permits of less yielding as the bicycle passes over obstructions. Other riders caring more for ease, prefer to fix the point of attachment forward of the center of the saddle spring, so that the rear portion of the saddle may yield vertically and thereby lessen materially the jolting of the machine. Both classes of riders at the same time have their particular fancies as to the proper pitch at which the saddle should be clamped. It should be noticed that the tilting of the saddle in its adjustment can be effected at any point of attachment equally well.

Another of the more important features of my invention is the fact that the character of the spring and its attachments to the saddle are such that a lateral tilting or oscillation is possible against the tension of the spring allowing the saddle to follow the motion of the body as one limb or the other is forced downward to propel the machine.

I claim as new and desire to secure by Letters Patent—

1. The combination with a saddle, A, and saddle rod, E, of a saddle spring, D, consisting of a rod bent laterally upon itself to form a serpentine middle portion and suitably connected at its opposite ends with the front and rear of the saddle and a clamping block, F, having a head tapered upon its under side downwardly toward the neck, a neck narrower than the space between the wave-like portions of the spring, a yoke below the neck adapted to receive the saddle rod and containing above the same a sliding block having its upper surface longitudinally concave to correspond to the under surface of the head, and a set screw at the bottom of the yoke adapted to clamp the sliding block and saddle rod tightly together; substantially as described.

2. The combination with the seat pommel and cantle of a saddle, of a spring consisting of a rod bent laterally upon itself in the form of a serpentine curve and fastened at its opposite ends to the pommel and cantle, respectively, and a supporting clamp secured to the intermediate portion of said spring, and having bearing surfaces, concave and convex, respectively, between which two adjacent transverse portions of the spring are clamped.

LEVI M. DEVORE.

Witnesses:
CHARLES O. SHERVEY,
A. I. H. EBBESEN.